US010037483B2

(12) United States Patent
Hayashi

(10) Patent No.: US 10,037,483 B2
(45) Date of Patent: Jul. 31, 2018

(54) PRINTING APPARATUS THAT PRINTS TARGET DATA IN RESPONSE TO MATCHING OF PASSWORD INFORMATION

(71) Applicant: Brother Kogyo Kabushiki Kaisha, Nagoya-shi, Aichi-ken (JP)

(72) Inventor: Hiroyuki Hayashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/377,524

(22) Filed: Dec. 13, 2016

(65) Prior Publication Data

US 2017/0177985 A1 Jun. 22, 2017

(30) Foreign Application Priority Data

Dec. 17, 2015 (JP) .................................. 2015-246003

(51) Int. Cl.
 *G06K 15/00* (2006.01)
 *H04N 1/00* (2006.01)
 *H04N 1/44* (2006.01)
 *G06F 3/12* (2006.01)

(52) U.S. Cl.
 CPC ..... *G06K 15/4095* (2013.01); *H04N 1/00411* (2013.01); *H04N 1/444* (2013.01); *H04N 1/4413* (2013.01); *H04N 2201/0094* (2013.01)

(58) Field of Classification Search
 None
 See application file for complete search history.

(56) References Cited

U.S. PATENT DOCUMENTS

| 5,970,218 A | * | 10/1999 | Mullin | G06F 21/608 |
|---|---|---|---|---|
| | | | | 358/1.15 |
| 2012/0099149 A1 | * | 4/2012 | Inoue | G06F 3/1204 |
| | | | | 358/1.15 |
| 2013/0038903 A1 | * | 2/2013 | Maki | G06F 3/1204 |
| | | | | 358/1.15 |

FOREIGN PATENT DOCUMENTS

| JP | 2009-267675 A | 11/2009 |
|---|---|---|
| JP | 2012-030490 A | 2/2012 |

* cited by examiner

*Primary Examiner* — Dov Popovici
(74) *Attorney, Agent, or Firm* — Banner & Witcoff, Ltd.

(57) ABSTRACT

In a printing apparatus, printing requests for first and second target data are received via a network interface from a terminal device. First target data, first password information, and first identification information are stored in association with one another in a memory, and second target data, second password information, and first identification information are stored in association with one another in the memory. When it is determined that the specific password information received via the inputting device matches the first password information, the printing device is controlled to print a first image represented by the first target data, the second target data whose associating identification information is the first identification information associated with the first target data is extracted from the memory, and the printing device is controlled to print a second image represented by the second target data.

18 Claims, 8 Drawing Sheets

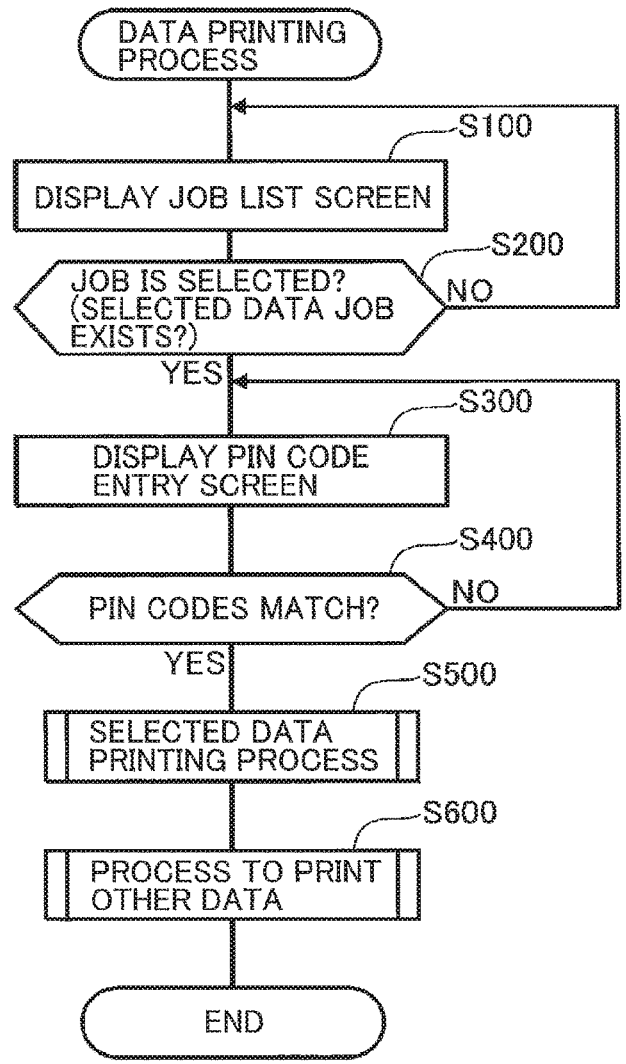
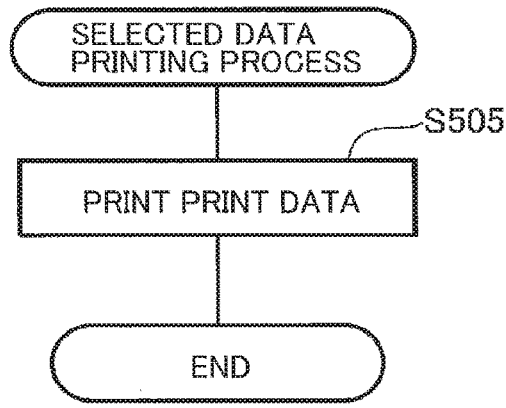

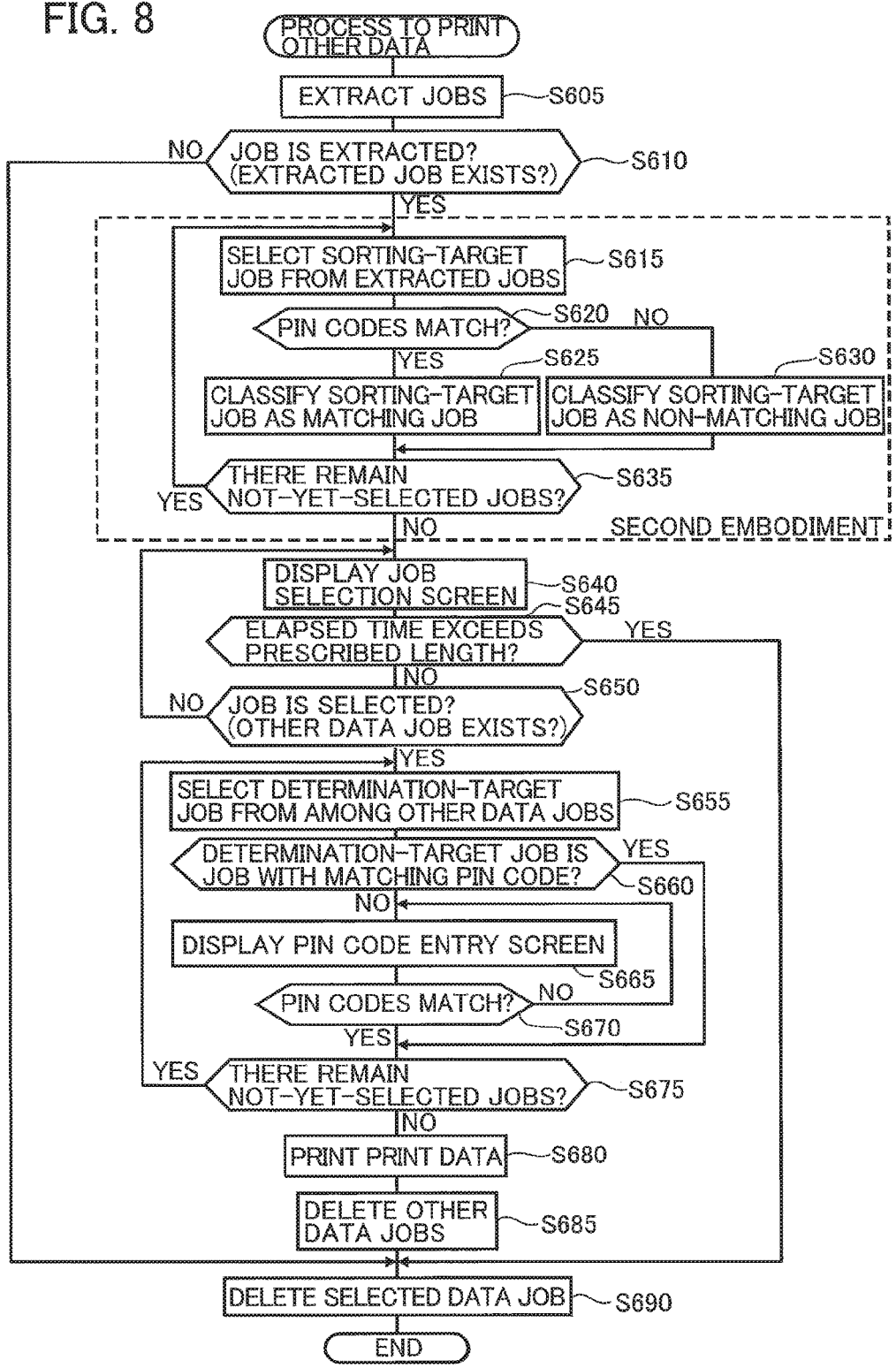

PRINTING APPARATUS THAT PRINTS TARGET DATA IN RESPONSE TO MATCHING OF PASSWORD INFORMATION

CROSS REFERENCE TO RELATED APPLICATION

This application claims priority from Japanese Patent Application No. 2015-246003 filed Dec. 17, 2015. The entire content of the priority application is incorporated herein by reference.

TECHNICAL FIELD

The present disclosure relates to a printing apparatus for printing target data when authentication information matches.

BACKGROUND

There has conventionally been proposed such a multifunction peripheral that can execute a "private print" for printing image data upon completion of successful authentication. This conventional multifunction peripheral stores print data and an authentication code received from a personal computer in association with data identifying the transmitter of the print data. The transmitter of the print data (the user requesting the printing operation) selects the transmitter's own name through a touchscreen on the multifunction peripheral based on data identifying the transmitter and inputs an authentication code in the subsequently displayed screen. In response, the multifunction peripheral displays a list of print data that is stored in association with the inputted authentication code from among all the print data that the user transmitted to the multifunction peripheral from the personal computer. The user selects desired print data from the list, and the multifunction peripheral performs a printing operation based on the selected print data.

However, the conventional multifunction peripheral only displays a list of those print data that is stored in association with the inputted authentication code from among all print data that the user had transmitted from the personal computer. In other words, the user cannot view all print data that the user had transmitted. Consequently, the user could forget to print data associated with different authentication data that is not displayed in the list.

SUMMARY

In view of the foregoing, it is an object of the disclosure to provide a system for reducing the chance that a user will forget to print images represented by target data stored in memory in association with authentication information.

According to one aspect, a printing apparatus includes: an inputting device; a printing device; a network interface; and a controller. The controller is configured to perform:

receiving, via the network interface from a terminal device, a printing request for first target data and a printing request for second target data, the printing request for first target data including first password information associated with the first target data and first identification information identifying a user who uses the terminal device, the printing request for second target data including second password information associated with the second target data and the first identification information;

storing the first target data, the first password information, and the first identification information in association with one another in a memory, and storing the second target data, the second password information, and the first identification information in association with one another in the memory;

receiving, via the inputting device, input of specific password information that is required to print a first image represented by the first target data;

judging whether the specific password information received via the inputting device matches the first password information stored in the memory; and when it is determined, in the judging, that the specific password information matches the first password information, controlling the printing device to print the first image represented by the first target data that is stored in the memory in association with the first password information, extracting, from the memory, the second target data whose associating identification information is the first identification information associated with the first target data, and controlling the printing device to print a second image represented by the second target data.

According to another aspect, a non-transitory computer readable storage medium stores a set of program instructions for a printing apparatus. The printing apparatus includes: an inputting device; a printing device; a network interface; and a processor. The program instructions, when executed by the processor, cause the printing apparatus to perform:

receiving, via the network interface from a terminal device, a printing request for first target data and a printing request for second target data, the printing request for first target data including first password information associated with the first target data and first identification information identifying a user who uses the terminal device, the printing request for second target data including second password information associated with the second target data and the first identification information;

storing the first target data, the first password information, and the first identification information in association with one another in a memory, and storing the second target data, the second password information, and the first identification information in association with one another in the memory;

receiving, via the inputting device, input of specific password information that is required to print a first image represented by the first target data;

judging whether the specific password information received via the inputting device matches the first password information stored in the memory; and when it is determined, in the judging, that the specific password information matches the first password information, controlling the printing device to print the first image represented by the first target data that is stored in the memory in association with the first password information, extracting, from the memory, the second target data whose associating identification information is the first identification information associated with the first target data, and controlling the printing device to print a second image represented by the second target data.

BRIEF DESCRIPTION OF THE DRAWINGS

The particular features and advantages of the disclosure will become apparent from the following description taken in connection with the accompanying drawings, in which:

FIG. 6 is a flowchart illustrating steps in the data printing process according to the first embodiment;

FIG. 7 is a flowchart illustrating steps in a selected data printing process in FIG. 6;

FIG. 8 is a flowchart illustrating steps in a process to print other data in FIG. 6.

DETAILED DESCRIPTION

Figure 1:
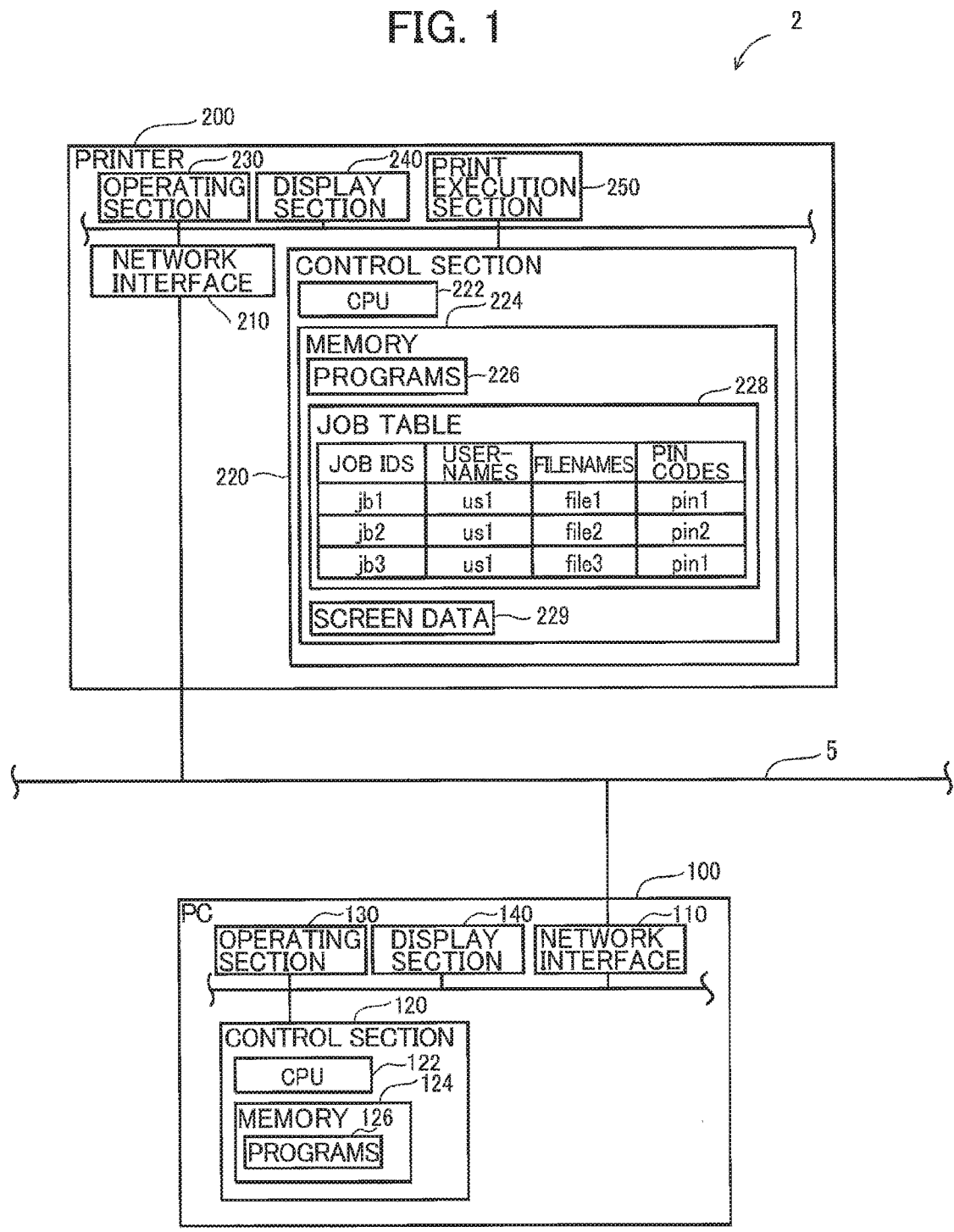
FIG. 1 is a block diagram showing a printing system according to a first embodiment.

A printing apparatus according to embodiments will be described while referring to the accompanying drawings wherein like parts and components are designated by the same reference numerals to avoid duplicating description.

First Embodiment

FIG. 1 is a block diagram showing a printing system 2. The printing system 2 includes a personal computer (PC) 100, and a printer 200. The PC 100 and printer 200 belong to the same local area network (hereinafter "LAN") 5. Hence, the PC 100 can communicate with the printer 200 via the LAN 5 instead of the Internet. Note that, while a single PC 100 is shown in FIG. 1, in reality a plurality of devices may be connected to the LAN 5.

Structure of the PC 100

The PC 100 is a terminal through which a user can print image data on the printer 200. The PC 100 includes a network interface 110, a control section 120, an operating section 130, and a display section 140. The network interface 110 functions to transmit and receive signals over a network, such as the LAN and Internet.

The control section 120 includes a CPU 122 and a memory 124. The memory 124 stores programs 126. The memory 124 may include RAM, ROM, and a hard disk drive, for example. The CPU 122 executes various processes according to the programs 126 stored in the memory 124. Note that the programs 126 also include a printing application (not shown) described later.

The operating section 130 includes a keyboard and a mouse. By operating the operating section 130, the user can input a variety of instructions into the PC 100. The display section 140 displays various information.

Structure of the Printer 200

The printer 200 is a laser printer. The printer 200 includes a network interface 210, a control section 220, an operating section 230, a display section 240, and a print execution section 250. The network interface 210 functions to transmit and receive signals over a network, such as the LAN 5 and Internet.

The control section 220 includes a CPU 222, and memory 224. The memory 224 stores programs 226, a job table 228, and screen data 229. The memory 224 includes RAM, ROM, and a hard disk drive, for example. The CPU 222 executes various processes according to the programs 226 stored in the memory 224. The programs 226 include: a program for a data storing process which will be described later with reference to FIG. 2; and a program for a data printing process which will be described later with reference to FIGS. 4 through 8.

The job table 228 stores job IDs, usernames, filenames, and personal identification number (PIN) codes. A job ID is unique identification information used to identify a job generated in response to a request from a PC. A username is identification information used to identify the user operating the PC from which a request was received. A filename is identification information used to identify print data that is generated based on image data associated with a job. A PIN code is password information required for printing print data. The PIN code may be configured of four numerical digits, for example. As will be described later in greater detail, the printer 200 can execute a secure print. A secure print is a printing method that requires the user to input the PIN code associated with the print data via the operating section 230 and display section 240, and that allows the print data to be printed when the inputted PIN code matches the PIN code stored in the job table 228. In the example of FIG. 1, three jobs are currently stored in the job table 228.

The screen data 229 is page data described in Extensible Markup Language (XML) specifying a screen displayed on the display section 240 and is used for executing a secure print.

The operating section 230 includes a plurality of keys. By operating the operating section 230, the user can input various instructions into the printer 200. The display section 240 serves to display various information. Note that the display section 240 also functions as a touchscreen for receiving user operations. The print execution section 250 executes a process for printing externally acquired data on printing media.

Operations of the Printing System 2

Data Storing Process

Figure 2:
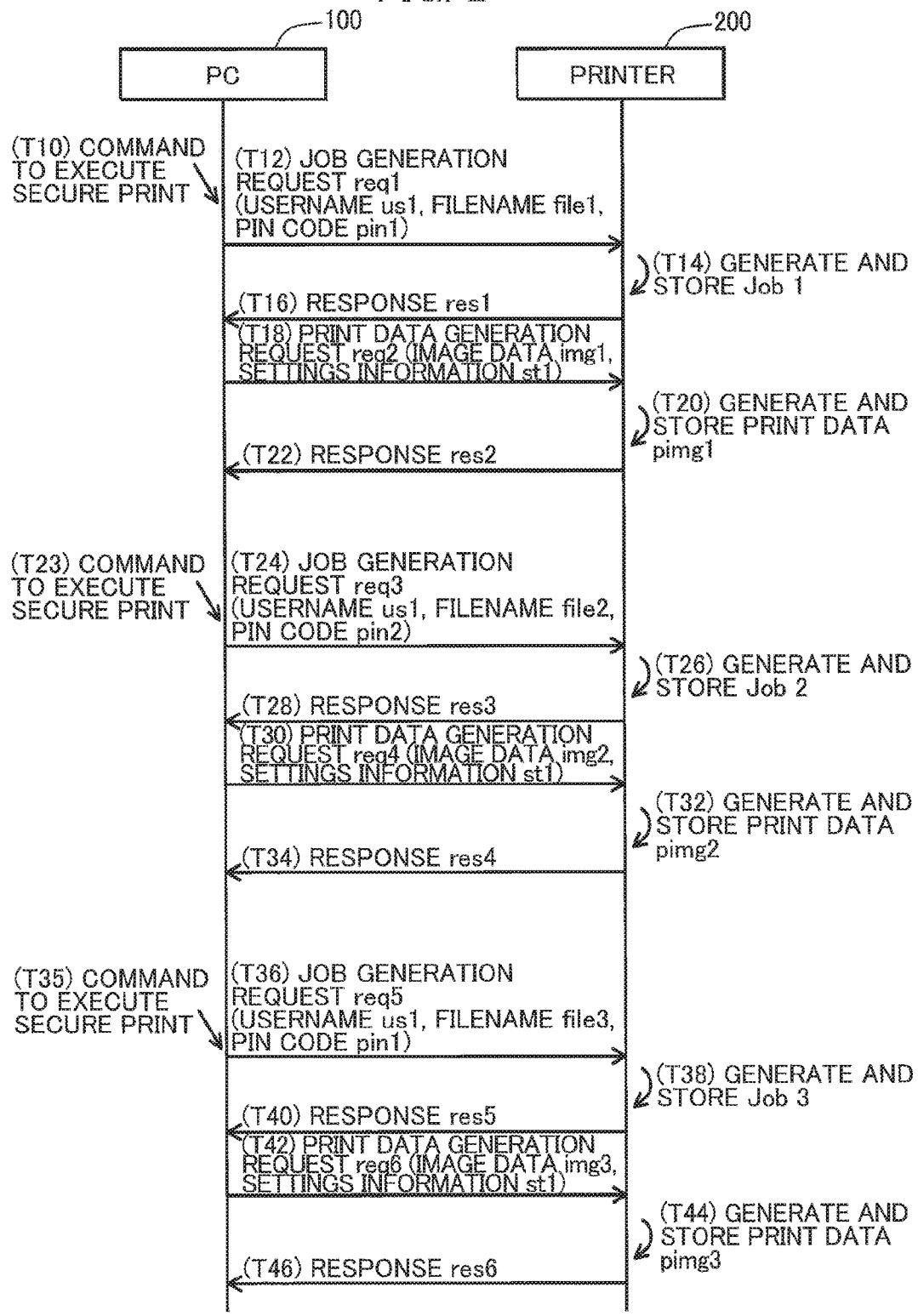
FIG. 2 is a diagram showing the sequence of steps in a data storing process according to the first embodiment.

Next, the data storing process executed by the printing system 2 will be described with reference to FIG. 2. FIG. 2 is a diagram showing the sequence of steps in the data storing process.

The printing system 2 executes the data storing process from steps T10 to T46 when the user operates the PC 100 to request the execution of a secure print. As described above, a secure print is a printing method for executing a printing operation after a PIN code is inputted into the printer 200. Specifically, the printer 200 does not immediately print the image data upon receiving the image data and a PIN code from the PC 100, but only prints the associated image data after the user inputs the corresponding PIN code.

In T10 the PC 100 receives a command from the user to execute a secure print. Specifically, when the user of the PC 100 selects an option to print image data img1 using an image browsing application, the PC 100 launches the printing application and displays a print settings screen SC1 on the display section 140.

Figure 3:
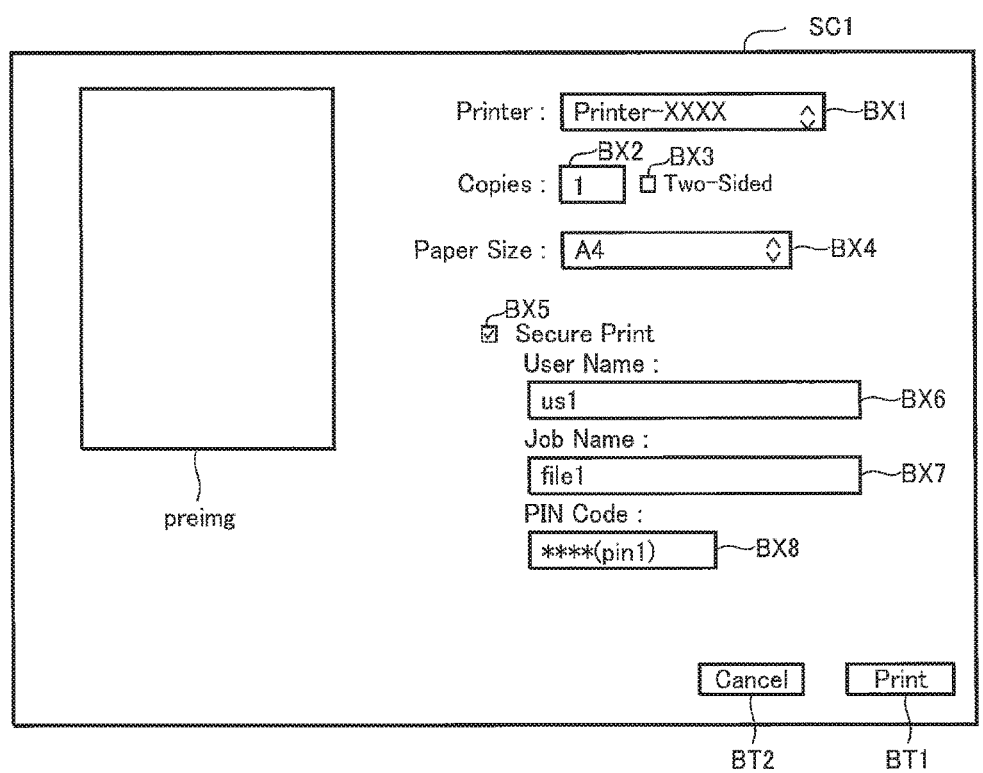
FIG. 3 shows a print settings screen according to the first embodiment.

FIG. 3 shows the print settings screen SC1 that is displayed on the display section 140 of the PC 100. The print settings screen SC1 includes a preview image preimg, which is a scaled-down version of the image represented by the image data img1, a list box BX1 for displaying a pull-down list of printers that can be used for printing. Specifically, the model names of printers associated with printer drivers that are installed on the PC 100 are displayed in the list box BX1. The user clicks on the list box BX1 to display the pull-down list of model names, and selects a desired model name to specify what printer to use for executing the printing operation.

The print settings screen SC1 also includes an input box BX2, a checkbox BX3, and a list box BX4 for specifying settings information. More specifically, the input box BX2 is provided for specifying the number of copies. The user inputs a numeral into the input box BX2 to indicate how many copies of the print job to print. The checkbox BX3 is provided for specifying two-sided (duplex) printing. The user inserts a check in the checkbox BX3 to indicate two-sided printing. The list box BX4 is provided for specifying paper size. All paper sizes that can be printed on the printer specified in the list box BX1 are displayed in the list box BX4. The user clicks on the list box BX4 to display a pull-down list of the paper sizes and selects a desired paper size. Through these operations, the printer 200 acquires the number of copies to print, the optional two-sided print setting, and the desired paper size as settings information st1.

The print settings screen SC1 also includes a checkbox BX5 and input boxes BX6-BX8. The checkbox BX5 is provided for specifying a secure print option. The user places a check in the checkbox BX5 to indicate a secure print. Note that inputting a check in the checkbox BX5 changes the displayed print settings screen SC1 by shifting the input boxes BX6-BX8 from a state in which input is not accepted (grayed-out state) to a state in which input is possible. The input boxes BX6-BX8 are provided for specifying parameters that are used only in a secure print.

Specifically, the input box BX6 is provided for specifying a username. The user specifies the username by inputting an arbitrary character string in the input box BX6. Note that the user may also leave the input box BX6 blank. In the latter case, the username used when logging in to the PC 100 at startup will be specified.

The input box BX7 is used for specifying a filename. The user specifies a filename by inputting an arbitrary character string in the input box BX7. Note that the user may also leave the input box BX7 blank, in which case the filename of the image data will be specified.

The input box BX8 is provided for specifying a PIN code. The user specifies a PIN code by inputting an arbitrary four-digit number in the input box BX8.

The print settings screen SC1 also includes a Print button BT1 and a Cancel button BT2. When the user presses the Print button BT1 after making the above specifications, the PC 100 acquires a command to execute a secure print that includes the settings information st1 and the parameters for secure printing. For example, if the user presses the Print button BT1 while the print settings screen SC1 is in the state shown in FIG. 3, the PC 100 acquires the printer 200 with the model name "Printer-XXXX" as the printer to execute the secure print, "1" as the number of copies, and "A4" as the paper size. The PC 100 also acquires a username us1, a filename file1, and a PIN code pin1 as the parameters for secure printing. Note that the PIN code is displayed as "****" when inputted due to its high confidentiality.

On the other hand, the user can cancel the printing operation by pressing the Cancel button BT2. If the user presses the Cancel button BT2, the PC 100 removes the print settings screen SC1 from the display section 140 and quits the printing application. The following description will assume that the user has pressed the Print button BT1 while the print settings screen SC1 is in the state shown in FIG. 3.

In T12 the PC 100 transmits a job generation request req1 to the printer 200. The job generation request req1 requests the printer 200 to generate a job for printing print data pimg1 that is generated based on the image data img1. The job generation request req1 also includes the username us1, filename file1, and PIN code pin1 acquired in T10.

In T14 the printer 200 generates a job (Job 1) based on the job generation request req1. The printer 200 includes the username us1, filename file1, and PIN code pin1 in the job. After generating the job, the printer 200 assigns a job ID jb1 to the job (Job 1) and stores the username us1, filename file1, and PIN code pin1 in the job table 228 in association with the job ID jb1.

In T16 the printer 200 transmits a response res1 to the PC 100. The response res1 is a response to the job generation request req1 and indicates that the job was successfully generated.

In T18 the PC 100 transmits a print data generation request req2 to the printer 200. The print data generation request req2 is a request to generate print data based on the settings information st1 acquired in T10. The PC 100 includes the image data img1 and the settings information st1 in the print data generation request req2. The information included in the settings information st1 is the number of copies "1" and the paper size "A4".

In T20 the printer 200 generates print data based on the print data generation request req2. More specifically, the printer 200 generates RGB output data from the image data img1. The RGB output data includes RGB values in the range 0-255 for each of the pixels in the image. Here, the printer 200 generates the RGB output data for an A4-size sheet of paper based on the settings information st1. Next, the printer 200 executes a color conversion process to convert the RGB values for each pixel in the RGB output data to CMYK values, thereby generating CMYK output data including CMYK values in the range 0-255 for each pixel in the image. Next, the printer 200 executes a thresholding process or binarizing process on the CMYK output data. The thresholding process may be implemented using a dither method or an error diffusion method, for example. Through this process, the printer 200 generates the print data pimg1 that assigns, to each pixel, either one of two tone-level values "1" and "0". Here, a "1" denotes that a dot is to be formed on the printing medium, while a "0" denotes that a dot is not to be formed. The printer 200 stores the print data pimg1 in the memory 224 in association with the job ID jb1. As a result, the print data pimg1 is associated with the username us1, filename file1, and PIN code pin1.

In T22 the printer 200 transmits a response res2 to the PC 100. The response res2 is a response to the print data generation request req2 and indicates that the print data pimg1 was successfully generated.

Steps T23 to T34 and T35 to T46 indicate cases in which the same user operates the PC 100 for instructing the printer 200 to execute secure prints at timings different from step T10.

In T23 through T34, as in T10 through T22, the printer 200 generates print data pimg2 and stores the print data pimg2 in the memory 224 in association with a job ID jb2 indicative of this job (Job 2). It is noted that in T24 the PC 100 transmits, to the printer 200, a job generation request req3 that includes the username us1, a filename file2, and a PIN code pin2. Thus, the print data pimg2 is associated with the same username us1 associated with the print data pimg1, but is associated with a different filename 2 and a different PIN code pin2 from those associated with the print data pimg1.

In T35 through T46, as in T10 through T22, the printer 200 generates print data pimg3 and stores the print data pimg3 in the memory 224 in association with a job ID jb3 indicative of this job (Job 3). It is noted that in T36 the PC 100 transmits a job generation request req5 that includes the username us1, a filename file3, and the PIN code pin1. Thus, the print data pimg3 is associated with the same username us1 and the same PIN code pin1 that are associated with the print data pimg1, but is associated with a different filename file3 from the filename associated with the print data pimg1.

Note that a user of a different terminal device than the PC 100 may also specify the printer 200 when issuing a print command. As a result of the operations in the above example, three jobs (Job 1, Job 2, and Job 3) are now registered in the job table 228 as illustrated in FIG. 1. All jobs in the job table 228 in the example of FIG. 1 were registered through a print command received from the same username us1. However, if a different user (a user with username us2, for example) were to issue a print command to the printer 200, a job associated with username us2 would be registered in the job table 228.

Data Printing Process

Figure 4:
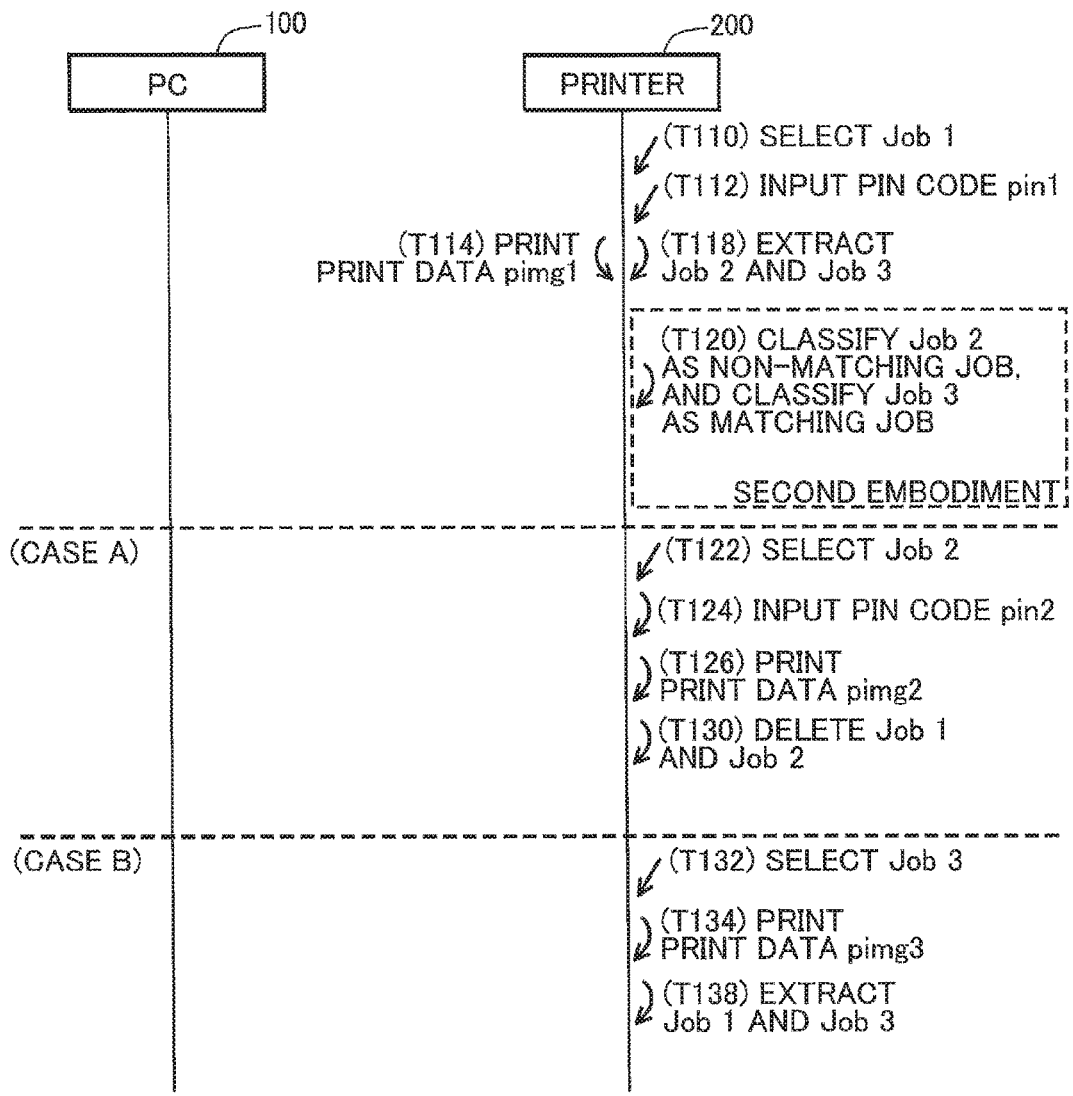
FIG. 4 is a chart showing the sequence of steps in a data printing process according to the first embodiment, and showing how steps are executed for Cases A and B.

Next, the data printing process performed on the printing system 2 will be described with reference to FIGS. 4 and 6. First, an overview of the data printing process will be described with reference to FIG. 4. FIG. 4 is a chart showing the sequence of steps in the data printing process. The process will be described later in greater detail with reference to FIG. 6.

The printing system 2 executes the data printing process when the printer 200 receives a user-operation for selecting a button displayed on the display section 240 instructing the printer 200 to execute a secure print. The description in the example of FIG. 4 is for a case in which the printer 200 received the operation to select the button for executing a secure print after a plurality of sets of print data were generated and stored in the memory 224 in the data storing process described in T10 through T46. In the data printing process, the printing system 2 first executes steps T110 through T118 and subsequently executes either steps T122 through T130 for Case A or steps T132 through T138 for Case B. Note that step T120 will be described later in the second embodiment.

In T110 of FIG. 4, the printer 200 receives a user-selection for a job to execute a printing operation. Specifically, in response to a user-operation, the printer 200 displays a list of filenames stored in all jobs registered in the job table 228. The user selects one of the filenames from the list. In this example, it will be assumed that the user selects filename file1. Accordingly, the printer 200 receives a selection for Job 1 (job ID jb1) associated with filename file1.

In T112 the printer 200 receives a PIN code inputted by the user. Specifically, the printer 200 displays, on the display section 240, an input screen prompting the user to input a PIN code. The user then operates the operating section 230 to input PIN code pin1 in the input screen. Note that the user may also input PIN code pin1 in the input screen using the touchscreen of the display section 240.

In T114 the printer 200 prints the print data pimg1 if the PIN code pin1 inputted in T112 matches the PIN code stored in association with job ID jb1. Here, the printer 200 controls the print execution section 250 to print the print data pimg1 on a printing medium based on the settings information st1 received in T18.

In T118 the printer 200 extracts, from the job table 228, all jobs that are associated with the username us1 in the selected Job 1. In this example, the printer 200 extracts Job 2 and Job 3. Further, the printer 200 also displays a job selection screen SC10 on the display section 240 based on the extracted jobs.

Figure 5:
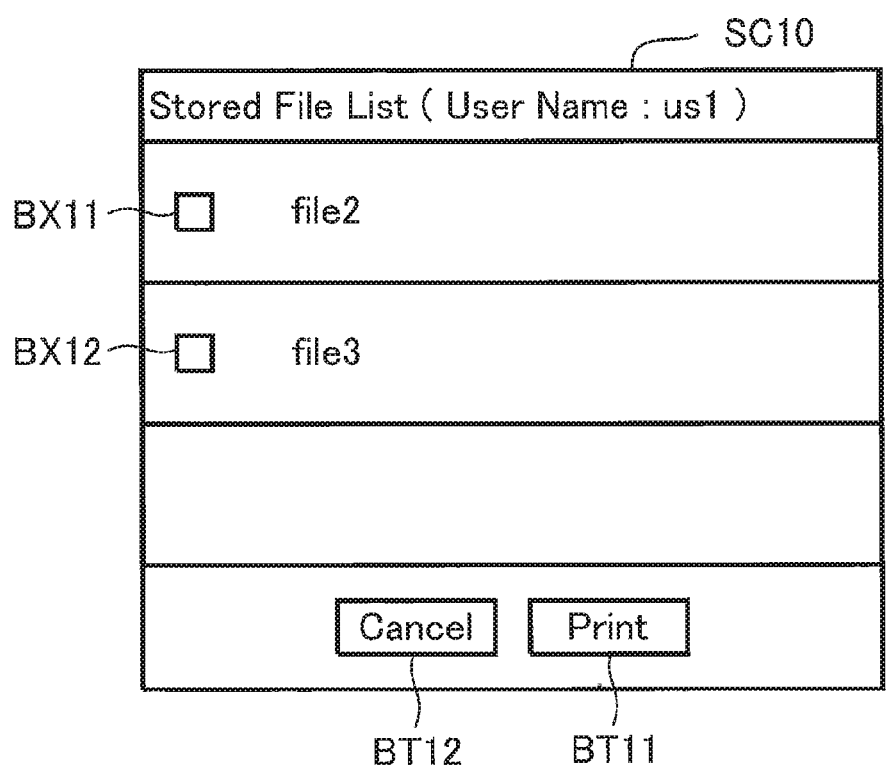
FIG. 5 shows a job selection screen according to the first embodiment.

FIG. 5 shows an example of the job selection screen SC10 displayed on the display section 240 of the printer 200. The job selection screen SC10 displays a list of the jobs extracted in T118. If the user selects a job in the job selection screen SC10 and instructs the printer 200 to execute a printing operation, the printer 200 prints the print data associated with the job. Here, extracted jobs are all jobs that were previously stored on the printer 200 by the user having the username us1 associated with Job 1 and that have not yet been executed. This screen reminds the user of print data that the user has stored on the printer 200 but may have forgotten to print, and enables the user to print this print data after the initially specified print data has been printed.

In this example, the job selection screen SC10 displays the username us1 associated with Job 1 selected in T110, and filenames file2 and file3 respectively associated with extracted Jobs 2 and 3. Accordingly, the user can discern that, among jobs the user previously stored on the printer 200, Jobs 2 and 3 have not yet been executed.

The job selection screen SC10 also includes checkboxes BX11 and BX12 for indicating what jobs the user wishes to execute. The checkbox BX11 corresponds to Job 2, and filename file2 is displayed next to the checkbox BX11. The checkbox BX12 corresponds to Job 3, and the filename file3 is displayed next to the checkbox BX12. The user places a check in the checkboxes for all jobs that the user wishes to execute based on the displayed filenames. For example, if the user wishes to execute all jobs previously stored on the printer 200 that have not yet been executed, the user would insert a check in both checkboxes BX11 and BX12 and press the print button BT11. As a result, the printer 200 acquires execution commands for both Job 2 and Job 3.

However, the user can cancel the execution of additional jobs simply by pressing the Cancel button BT12. When the Cancel button BT12 is pressed, the printer 200 stops displaying the job selection screen SC10.

Here, the case in which the user specifies execution of Job 2 will be described as Case A.

In T122 of FIG. 4, the printer 200 acquires a command to execute Job 2. As described above, the printer 200 acquires a command to execute Job 2 when the user inserts a check in the checkbox BX11 in the job selection screen SC10 and presses the print button BT11.

Since the PIN code set for Job 2 is different from that set for Job 1, in T124 the printer 200 receives a PIN code inputted from the user. Specifically, the printer 200 displays, on the display section 240, an input screen prompting the user to input a PIN code. In this case, the user operates the operating section 230 to input PIN code pin2 in the input screen. Note that the user may also input PIN code pin2 in the input screen using the touchscreen of the display section 240.

If the inputted PIN code pin2 matches the PIN code stored in association with Job 2, in T126 the printer 200 prints the print data pimg2. Here, the printer 200 controls the print execution section 250 to print the print data pimg2 on a printing medium based on the settings information st1 received in T30.

In T130 the printer 200 deletes Job 1 and Job 2. Specifically, the printer 200 deletes the associated job ID jb1, username us1, filename file1, and PIN code pin1 from the job table 228 and deletes the associated job ID jb2, username us1, filename file2, and PIN code pin2 from the job table 228. The printer 200 also deletes the print data pimg1 associated with job ID jb1 and the print data pimg2 associated with job ID jb2 from the memory 224. In other words, jobs executed in a secure print are deleted from the memory 224 of the printer 200 after the printing process is completed because the risk of image data being leaked through unauthorized access and the like is heightened when the image data is left in the memory 224. Thus, the printer 200 of the embodiment can better guarantee the security of data by not continuing to store jobs after they have been executed.

Upon completion of step T130, the data printing process ends. Note that the process in T114 and the process from T118 to T130 may both be started after completion of step T112 and executed in parallel. In other words, the printer 200 may extract Jobs 2 and 3 and display the job selection screen SC10 irrespective of whether or not printing of the print data pimg1 has completed. Therefore, the user can view the job selection screen SC10 while the print data pimg1 is being printed, for example.

Next, a case in which the user selects Job 3 to be executed will be described as Case B.

In T132 the printer 200 acquires a command to execute Job 3. As described above, the printer 200 acquires a command to execute Job 3 when the user inserts a check in the checkbox BX12 in the job selection screen SC10 and presses the print button BT11.

In this case, the PIN code stored in association with Job 3 is PIN code pin1, which is the same PIN code stored in association with the just executed Job 1. Accordingly, the printer 200 does not prompt the user to input a PIN code but treats the previously inputted PIN code as the PIN code for printing the print data pimg3. Thus, the printer 200 can guarantee security when printing print data while reducing the time and effort required for the user to execute a secure print.

In T134 the printer 200 prints the print data pimg3. Here, the printer 200 controls the print execution section 250 to print the print data pimg3 on a printing medium based on the settings information st1 received in T42.

In T138 the printer 200 deletes Jobs 1 and 3. Specifically, the printer 200 deletes the associated job ID jb1, username us1, filename file1, and PIN code pin1 from the job table 228 and deletes the associated job ID jb3, username us1, filename file3, and PIN code pin1 from the job table 228. The printer 200 also deletes the print data pimg1 associated with job ID jb1 and print data pimg3 associated with job ID jb3 from the memory 224.

Upon completion of step T138, the data printing process ends. As with Case A described above, the process in T114 and the process in T118 and from T132 through T138 may both be initiated upon completion of step T122 and executed in parallel.

Note that when the user specifies the execution of both Jobs 2 and 3, the printer 200 will execute both Case A and Case B. There is no particular restriction on the order in which these cases are executed. For example, Case A may be performed after Case B. Further, if the user presses the Cancel button BT12 in job selection screen SC10 or does not perform an operation for instructing the execution of Job 2 and Job 3 within a prescribed time, the printer 200 will simply delete Job 1.

Next, the data printing process executed by the CPU 222 of the printer 200 will be described in greater detail with reference to FIG. 6. FIG. 6 is a flowchart illustrating steps in the data printing process. As described above, the data printing process begins when the printer 200 receives a user-operation for selecting a button displayed on the display section 240 to execute a secure print after print data has been generated and stored in the memory 224 through the data storing process.

Upon receiving the operation for selecting the button for executing a secure print, in S100 of FIG. 6 the CPU 222 displays a job list screen on the display section 240 and accepts a user-selection for a job to execute. The job list screen includes a list of filenames for all jobs stored in the job table 228, checkboxes for selecting a desired job to execute, an Execution button for instructing the printer 200 to execute the job, and a Cancel button for canceling execution of the secure print. Note that the job list screen in the embodiment displays a list of filenames for all jobs stored in the job table 228, irrespective of the username. However, if the user inputs a username in an operation to log in to the printer 200, for example, prior to selecting the button to execute a secure print, the printer 200 then extracts only jobs associated with the inputted username from the job table 228 and displays these extracted jobs in the job list screen.

In S200 the CPU 222 determines whether the user selected a job in the job list screen and pressed the Execution button. When the user has not pressed the Execution button in the job list screen or when the user has pressed the Execution button without having placed a check in a box for selecting a job, the CPU 222 determines that no job selection has been made (S200: NO), and returns to S100. However, if the user has pressed the Execution button while a checkbox is selected, the CPU 222 determines that a job selection has been made (S200: YES) and advances to S300. The CPU 222 ends the data printing process if the Cancel button is pressed (not shown).

In S300 the CPU 222 displays a PIN code entry screen required for executing the job selected in the job list screen (hereinafter called the "selected data job") and accepts a PIN code inputted from the user. The PIN code entry screen includes a box for inputting a PIN code, an Authorize button for commanding authorization of the PIN code, and a Cancel button for canceling entry of the PIN code.

In S400 the CPU 222 determines whether the PIN code inputted in the PIN code entry screen matches the PIN code associated with the selected data job. That is, when the user presses the Authorize button for commanding authorization after inputting a PIN code into the box in the PIN code entry screen, the CPU 222 executes authorization of the PIN code. More specifically, the CPU 222 determines whether the inputted PIN code matches the PIN code stored in the job table 228 in association with the selected data job.

The CPU 222 returns to S300 when the inputted PIN code does not match the PIN code associated with the selected data job (S400: NO), and advances to S500 when the PIN codes match (S400: YES). The CPU 222 returns to S100 to repeat the process for receiving a job selection when the Cancel button is pressed (not shown).

In S500 the CPU 222 executes a selected data printing process that will be described in greater detail with reference to FIG. 7. FIG. 7 is a flowchart illustrating steps in the selected data printing process.

In S505 of FIG. 7, the CPU 222 prints the print data associated with the selected data job. In this process, the CPU 222 controls the print execution section 250 to print the print data on a printing medium based on the settings information included in the print request issued for generating the selected data job. After completing step S505, the CPU 222 ends the selected data printing process.

The CPU 222 also begins the process in S600 at the same time as the process in S500.

In S600 the CPU 222 executes a process to print other data that will be described in greater detail with reference to FIG. 8. FIG. 8 is a flowchart illustrating steps in the process to print other data. Note that steps S615 through S635 will be described later in the second embodiment.

In S605 of FIG. 8, the CPU 222 extracts, from the job table 228, all jobs that are associated with the same username in the selected data job.

In S610 the CPU 222 determines whether a job was extracted in S605. If no jobs were extracted (S610: NO), the process proceeds to S690 to be described later. However, when one or more jobs were extracted (S610: YES), the CPU 222 advances to S640.

In S640 the CPU 222 displays the job selection screen SC10 (see FIG. 5) on the display section 240 based on the jobs extracted in S605 (hereinafter called the "extracted jobs") and accepts a user-selection for a job to be executed. As described above, the job selection screen SC10 includes filenames associated with the extracted jobs. Through the job selection screen SC10, the user can select a filename to instruct the printer 200 to execute a job associated with the same username in the selected data job.

In S645 the CPU 222 begins counting elapsed time from when the job selection screen SC10 started being displayed, and determines whether the elapsed time exceeds a prescribed length. The prescribed length may be 3 minutes, for example. If the elapsed time exceeds the prescribed length (S645: YES), the CPU 222 removes the displayed job selection screen SC10 from the display section 240, and the process proceeds to S690 to be described later. Since the job selection screen SC10 displays all jobs associated with the same username in the currently selected data job, it is preferable to avoid these jobs being seen by a third party. By removing the display after a prescribed time has elapsed, the CPU 222 can reduce the possibility of a third party seeing the job selection screen SC10, even when the current user neglects to issue a command to halt the display of the job selection screen SC10. On the other hand, while the elapsed time does not exceed the prescribed length (S645: NO), the CPU 222 advances to S650.

In S650 the CPU 222 determines whether the user selected one or more jobs in the job selection screen SC10 and issued a command to execute the selected jobs. When the print button BT11 has not been pressed in the job selection screen SC10 or when the print button BT11 is pressed while a check has not been inserted in the checkbox BX11 or BX12 for selecting a job, the CPU 222 determines that no job was selected (S650: NO) and returns to S640.

However, if the user presses the print button BT11 while at least one of the checkboxes BX11 and BX12 is selected (S650: NO), the CPU 222 determines that job selection was made, and advances to S655. Here, if the Cancel button BT12 is pressed (not shown), the CPU 222 removes the displayed job selection screen SC10 from the display section 240 and ends the process to print other data. In other words, the user can use the job selection screen SC10 to command the printer 200 both to execute and not to execute those jobs that are associated with the same username in the currently-selected data job.

In S655, the CPU 222 selects, from among the jobs selected in the job selection screen SC10 (hereinafter called the "other data jobs"), a job (hereinafter called a "determination-target job") to be used in the determination of S660 described below for determining whether the job has a matching PIN code. For example, the CPU 222 may select as the determination-target job the job having the smallest job ID among the other data jobs that has not yet been selected to be the determination-target job.

In S660 the CPU 222 determines whether the determination-target job selected in S665 is a job with matching PIN code. A job with matching PIN code is a job stored in the job table 228 in association with a PIN code that matches the PIN code associated with the job selected in the job list screen (the selected data job). If the CPU 222 determines that the determination-target job is a job with matching PIN code (S660: YES; Case B in FIG. 4), the CPU 222 regards, as a PIN code for the determination-target job, the PIN code that was inputted for the selected job in S300, and determines that a PIN code has already been inputted for the determination-target job. The process therefore advances to S675. In other words, the CPU 222 does not prompt the user to input a PIN code again in order to print out print data associated with a job having the same PIN code. In this way, when the user wishes to print out print data associated with the determination-target job, this configuration can eliminate the effort required by the user to input the PIN code while ensuring printing security.

However, if the CPU 222 determines in S660 that the determination-target job is not a job with matching PIN code (S660: NO; Case A in FIG. 4), the CPU 222 advances to S665 to receive a PIN code inputted by the user.

In S665 the CPU 222 displays the PIN code entry screen for executing the determination-target job and receives an inputted PIN code. As described above, the PIN code entry screen includes a box in which a PIN code can be entered, an Authorize button for commanding the printer 200 to authorize the PIN code, and a Cancel button for canceling authorization of the PIN code. In this way, the printer 200 can print out print data while ensuring security when the print data associated with the determination-target job is associated with a different PIN code from the PIN code associated with the selected data job.

In S670 the CPU 222 determines whether the PIN code inputted in the PIN code entry screen matches the PIN code stored in the job table 228 in association with the determination-target job.

The CPU 222 returns to S665 when the inputted PIN code does not match the PIN code associated with the determination-target job (S670: NO) and advances to S675 when the PIN codes match (S670: YES). Further, if the user presses the Cancel button (not shown), the CPU 222 removes the determination-target job from the other data jobs so as not to execute this job in S680 described later.

In S675 the CPU 222 determines whether any of the other data jobs selected in the job selection screen SC10 have not yet been selected as the determination-target job. The CPU 222 returns to S655 when there remain jobs that have not yet been selected as the determination-target job (S675: YES), and advances to S680 when all of the other data jobs have been selected as the determination-target job (S675: NO).

In S680 the CPU 222 prints the print data associated with the other data jobs. Here, the CPU 222 controls the print execution section 250 to print the print data on a printing medium based on the settings information that was included in the print requests issued for generating the other data jobs.

In S685 the CPU 222 deletes the other data jobs. Specifically, the CPU 222 deletes, from the job table 228, all job IDs, usernames, filenames, and PIN codes that are associated with the other data jobs. The CPU 222 also deletes, from the memory 224, all print data that is associated with the job IDs of the other data jobs.

In S690 the CPU 222 deletes the selected data job. Specifically, the CPU 222 deletes, from the job table 228, the job ID, username, filename, and PIN code that are associated with the selected data job. The CPU 222 also deletes, from the memory 224, the print data that is associated with the job ID of the selected data job.

Upon completion of step S690, the process to print other data ends. As described above, the selected data printing process (S500) and the process to print other data (S600) both begin upon completion of the process in S400 and are executed in parallel. Accordingly, the data printing process ends when both processes in S500 and S600 are completed. In this way, the user can still view the job selection screen SC10 and issue commands to execute other data jobs while print data associated with the selected data job is being printed.

Second Embodiment

Data Printing Process

Next, a data printing process executed by the printing system 2 according to a second embodiment will be described. In the second embodiment, the processes provided in the dashed boxes of FIG. 4 and FIG. 8 are added to the process described in the first embodiment. Thus, only the additional processes in the dashed boxes will be described in the second embodiment.

First, an overview of the data printing process according to the second embodiment will be described with reference to FIG. 4. FIG. 4 is a chart showing the sequence of steps in the data printing process. As described above for steps T110 through T118, the user specifies Job 1 for execution, and the printer 200 extracts Jobs 2 and 3 associated with the username us1 in Job 1.

In T120 the printer 200 sorts the extracted jobs into matching jobs and non-matching jobs. Matching jobs are those jobs stored in the job table 228 that have the same PIN code as the PIN code pin1 for Job 1. Non-matching jobs are jobs stored in the job table 228 having a different PIN code from the PIN code pin1.

The printer 200 first determines whether the PIN code associated with Job 1 matches the PIN code associated with the extracted Job 2. Since Job 1 is associated with PIN code pin1 and Job 2 is associated with PIN code pin2, the PIN codes do not match. Thus, the printer 200 classifies Job 2 as a non-matching job.

Next, the printer 200 determines whether the PIN code associated with Job 1 matches the PIN code associated with the extracted Job 3. Since Job 1 is associated with PIN code pin1 and Job 3 is also associated with PIN code pin1, their PIN codes match. Thus, the printer 200 classifies Job 3 as a matching job.

Next, the printer 200 displays a job selection screen SC20 on the display section 240 based on Jobs 2 and 3 classified as either matching jobs or non-matching jobs.

Figure 9:
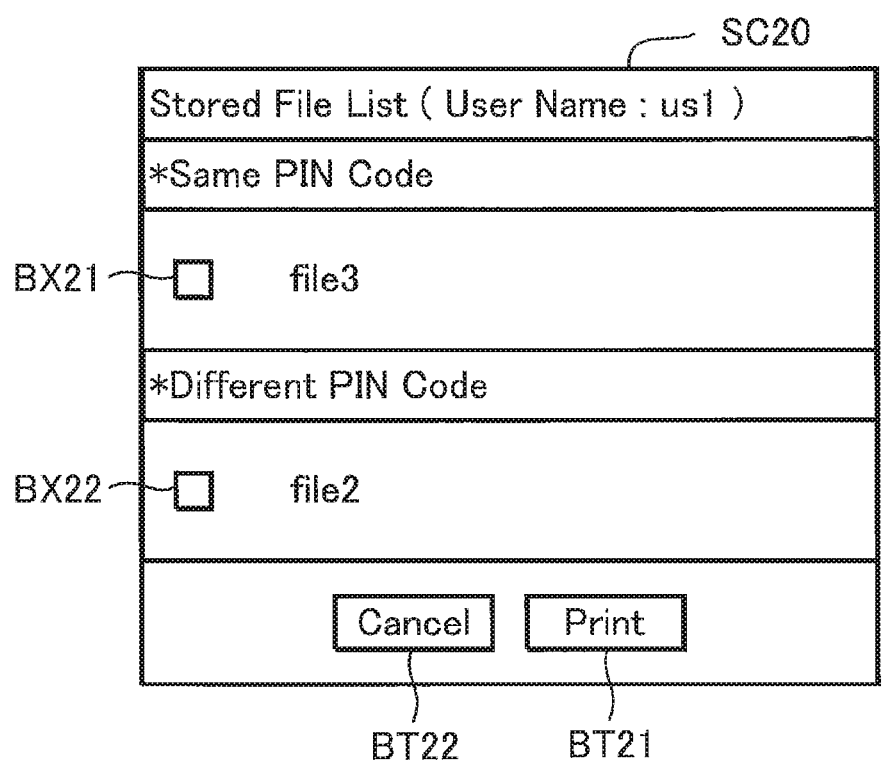
FIG. 9 shows a job selection screen according to a second embodiment.

FIG. 9 shows an example of the job selection screen SC20 displayed on the display section 240. The job selection screen SC20 provides a list of the extracted jobs. If the user selects one or more jobs and instructs the printer 200 to execute the selected jobs in the job selection screen SC20, the printer 200 prints the associated print data. Here, the extracted jobs are those jobs that the user, who is associated with Job 1, previously stored in the printer 200 but has not yet executed. The printer 200 displays the job selection screen SC20 in order that the user, after printing the originally specified print data, can continue to print additional print data that the user previously stored in the printer 200 but forgot to print.

The job selection screen SC20 displays the username us1 associated with Job 1 selected in T110, and filenames file2 and file3 respectively associated with extracted Jobs 2 and 3. Here, matching jobs and non-matching jobs are sorted and displayed separately. Since Job 2 is a non-matching job, filename file2 is displayed following a character string indicating files with PIN codes that differ from the PIN code of Job 1. Further, since Job 3 is a matching job, filename file3 is displayed following a character string indicating files with PIN codes that match the PIN code of Job 1. From this display, the user can readily see that Jobs 2 and 3 were previously stored on the printer 200 and have not yet been executed. The display also gives the user advance notice regarding whether the jobs yet to be executed have PIN codes matching the PIN code of the job currently being executed.

The job selection screen SC20 also includes checkboxes BX21 and BX22 for indicating what jobs the user wishes to execute. The checkbox BX21 corresponds to Job 3, and the filename file3 is displayed next to the checkbox BX21. The checkbox BX22 corresponds to Job 2, and the filename file2 is displayed next to the checkbox BX22. The user places a check in the checkboxes for all jobs that the user wishes to execute based on the displayed filenames. For example, if the user wishes to execute all jobs previously stored on the printer 200 that have not yet been executed, the user would insert a check in the checkboxes BX21 and BX22 and press the Print button BT21. As a result, the printer 200 acquires execution commands for Job 2 and Job 3.

However, the user can also cancel execution of additional jobs by pressing the Cancel button BT22. When the Cancel button BT22 is pressed, the printer 200 stops displaying the job selection screen SC20.

The process after T120 is identical to that described in the first embodiment and will not be repeated here.

As indicated by dashed box in FIG. 8, according to the second embodiment, processes of S615-S635 are added in the process to print other data in the first embodiment. It is noted that as described above, the CPU 222 extracts all jobs (extracted jobs) associated with the same username as that of the job selected in the job list screen (selected data job) through steps S605 and S610.

In S615 the CPU 222 selects a sorting-target job from the extracted jobs in order to sort the extracted jobs into matching jobs and non-matching jobs in S625 and S630 described later. For example, the CPU 222 may select the extracted job having the smallest job ID among the extracted jobs not yet selected to be the sorting-target job.

In S620 the CPU 222 determines whether the PIN code associated with the sorting-target job matches the PIN code associated with the selected data job. If the PIN codes match (S620: YES), the CPU 222 advances to S625.

In S625 the CPU 222 classifies the sorting-target job as a matching job. In order to save the results of this classification, the CPU 222 may store a matching job flag in the job table 228 in association with the job ID of the sorting-target job, for example. Upon completing the process in S625, the CPU 222 advances to S635 described later.

On the other hand, if the CPU 222 determines in S620 that the PIN code of the sorting-target job does not match the PIN code of the selected data job (S620: NO), the CPU 222 advances to S630.

In S630 the CPU 222 classifies the sorting-target job as a non-matching job. In order to save the results of this classification, the CPU 222 may store a non-matching job flag in the job table 228 in association with the job ID of the sorting-target job, for example. Upon completing the process in S630, the CPU 222 advances to S635.

In S635 the CPU 222 determines whether there remain extracted jobs that have not yet been selected as the sorting-target job. The CPU 222 returns to S615 when there remain extracted jobs that have not been selected as the sorting-target job (S635: YES) and advances to S640 when determining that all extracted jobs have been selected as the sorting-target job (S635: NO).

The process from S640 is identical to that in the first embodiment and will not be repeated here.

As described above, when the user-inputted PIN code matches the PIN code pin1 stored in memory, the printer 200 prints the print data pimg1 associated with PIN code pin1, and additionally prints the print data pimg2 and print data pimg3 that are associated with the username the same as the username us1 associated with the print data pimg1. In other words, the printer 200 can print the print data pimg2 and print data pimg3 as a result of printing the print data pimg1. Therefore, the printer 200 according to the embodiments can reduce the occurrence of a user forgetting to print out print data stored in memory in association with the PIN code.

In the embodiments, the printer 200 displays the job selection screen SC10 or SC20 when printing the print data pimg1. Since the user inputs a PIN code on the operating section 230 of the printer 200 for printing the print data pimg1, it is highly probable that the user will view the screen displayed on the display section 240 of the printer 200 while the print data pimg1 is being printed. In the embodiments, the printer 200 displays the job selection screen SC10 or SC20 for print data pimg2 and print data pimg3 while the user is retrieving the printed material, thereby more effectively reducing the likelihood that the user will forget to print out print data.

In the embodiments, a job is deleted once the print data has been printed. Thus, jobs will remain in memory if the user forgets to print the print data in the job. Since jobs that are not executed continue to occupy memory, there is a possibility that other users will not be able to store their jobs or print data in memory when attempting to perform a secure print with their print data. However, when a user is printing out print data in the embodiments, the printer 200 can remind the same user of other print data that was previously stored in memory and prompt the user to print this other print data, thereby effectively utilizing memory in the printer 200.

Correspondences

The PC 100 is an example of the "terminal device". The printer 200 is an example of the "printing apparatus".

The print data pimg1 is an example of the "first target data", and the print data pimg2 and print data pimg3 are examples of the "second target data". The PIN code pin1 associated with the print data pimg1 is an example of the "first password information". The PIN code pin2 associated with the print data pimg2 and the PIN code pin1 associated with the print data pimg3 are examples of the "second password information". The username us1 is an example of the "first identification information". The PIN code inputted in T122 and T130 is an example of the "specific password information".

The print execution section 250 is an example of the "printing device". The operating section 230 and display section 240 are examples of the "inputting device". The network interface 110 is an example of the "network interface". The control section 220 is an example of the "controller". The CPU 222 is an example of the "processor". The memory 224 is an example of the "non-transitory computer readable storage medium".

Steps T12, T18, T24, T30, T36, and T42 in FIG. 2 are examples of "receiving printing requests for first and second target data". Steps T14, T20, T26, T32, T38, and T44 in FIG. 2 are examples of "storing the first target data, the first password information, and the first identification information in association with one another in the memory, and storing the second target data, the second password information, and the first identification information in association with one another in the memory". Steps T112 and T124 in FIG. 4, S300 in FIG. 6, and S665 in FIG. 8 are examples of the "receiving input of specific password information via the inputting device". Step S400 in FIG. 6 is an example of "judging whether the specific password information matches the first password information". Step T114 in FIG. 4 and S505 in FIG. 7 are examples of "controlling the printing device to print the first image". Steps T118 in FIG. 4 and S605 in FIG. 8 are examples of "extracting the second target data from the memory". Steps T126 and T134 in FIG. 4, and S680 in FIG. 8 are examples of "controlling the printing device to print a second image".

The display section 240 is an example of the "display". Step S640 in FIG. 8 is an example of the "controlling the display to display a print screen". Step S645 in FIG. 8 is an example of "measuring an elapsed time from when the print screen starts being displayed".

The job selection screen SC10 and job selection screen SC20 are examples of "print screen". The filename file2 and filename file3 are examples of the "second-target specifying information".

While the description has been made in detail with reference to specific embodiments thereof, it would be apparent to those skilled in the art that various changes and modifications may be made therein without departing from the spirit and scope of the above-described aspects.

First Variation

In the first and second embodiments described above, the printer 200 displays the job selection screen SC10 in S640 of FIG. 8 that enables the user to select a job to be executed from among jobs associated with the same username in the selected data job. However, rather than displaying the job selection screen SC10, the printer 200 may execute all jobs associated with the username matching the username associated with the selected data job. Further, rather than displaying the job selection screen SC10 or job selection screen SC20, the printer 200 may display a list of jobs associated with the username that matches the username in the selected data job and may display a confirmation screen including a message for confirming whether these jobs should be printed. By performing an operation in this confirmation screen, the user can execute all jobs associated with the same username as the username in the selected data job. In general terms, the printing apparatus may print a second image represented by second target data that is associated with the same first identification information associated with the first target data.

Second Variation

In the first and second embodiments described above, the printer 200 displays the job selection screen SC10 or SC20 in S640 of FIG. 8 and displays the PIN code entry screen in S665. However, the printer 200 may display a job selection screen in S640 that accepts input of a PIN code. In this case, an entry box is displayed adjacent to each filename in the job selection screen for inputting the corresponding PIN code. After the user selects a job, inputs the PIN code, and presses the Print button for commanding execution of the job, the printer 200 acquires the job selection and PIN code and advances to S660. Further, if the printer 200 determines in S660 that the determination-target job is not a job with matching PIN code (S660: NO), the printer 200 advances to S670 without executing S665. In general terms, the printing apparatus may display a print screen that allows the user to command the printing of second target data.

Third Variation

In the first and second embodiments described above, the printer 200 stops displaying the job selection screen SC10 or SC20 when determining in S645 of FIG. 8 that the amount of time that elapsed after having started displaying the job selection screen SC10 or SC20 has exceeded the prescribed length (S645: YES). However, the printer 200 may instead remove the display of the job selection screen SC10 or SC20 upon completion of the selected data printing process in FIG. 5. In general, the printing apparatus should remove the display of the print screen.

Fourth Variation

In the second embodiment described above, the printer 200 displays the job selection screen SC20 in S640 of FIG. 8 with jobs sorted into matching jobs and non-matching jobs. However, the printer 200 may instead display a job selection screen specifying only matching jobs and a separate job selection screen specifying only non-matching jobs. For example, the printer 200 may display a matching job selection screen and, after the user has selected one or more jobs from this screen, may display a non-matching job selection screen. In general, the printing apparatus should display a print screen that allows the user to command the printing of second target data associated with the same first identification information that is associated with the first target data.

Fifth Variation

In the first and second embodiments described above, the printer 200 stores the print data pimg1 in the memory 224 in association with the job ID jb1 in T20 of FIG. 2. However, the printer 200 may instead store the image data img1 received in T18 or the RGB output data produced from the image data img1. In this case, the printer 200 generates and prints the print data pimg1 based on the image data img1 and/or RGB output data in T114 of FIG. 4.

Further, the PC 100 may generate the print data pimg1 in place of the printer 200. In this case, when the PC 100 receives the response rest in T16, the PC 100 generates RGB output data from the image data img1 based on the settings information st1 and generates the print data pimg1 from the RGB output data. The specific method of generating print data is identical to the method described for T20. Thereafter, the PC 100 transmits the print data pimg1 to the printer 200. Note that, since the print data pimg1 was generated based on the settings information st1, the PC 100 need not transmit the settings information st1 in T18. In T20 the printer 200 stores the print data pimg1 in the memory 224 in association with the job ID jb1.

The variation described above may also be applied to the print data pimg2 and print data pimg3.

Sixth Variation

In the first and second embodiments described above, the printing system 2 is provided with the PC 100, but the printing system 2 may be provided with a smartphone or tablet device in place of the PC 100. In general, the printing system should be provided with a terminal device that can transmit a print request to the printer 200.

Seventh Variation

In the first and second embodiments described above, the printer 200 is a laser printer, but the printer 200 may be an inkjet printer instead. Generally speaking, the printing apparatus should be provided with a printing section.

Eighth Variation

In the first and second embodiments described above, CPU 122 of the PC 100 and the CPU 222 of the printer 200 execute all processes according to software (i.e., the programs 126 and programs 226), but these processes may instead be implemented with logic circuits and other hardware.

What is claimed is:

1. A printing apparatus comprising:
an inputting device;
a printing device;
a display;
a network interface; and
a controller configured to perform:
receiving, via the network interface from a terminal device, a printing request for a set of first target data and a plurality of printing requests for a plurality of sets of second target data, the printing request for the set of first target data including a set of first password information associated with the first target data and first identification information identifying a user who operated the terminal device, a printing request for each set of second target data including a set of second password information associated with each set of second target data and the first identification information;
storing the first target data, the first password information, and the first identification information in association with one another in a memory, and storing the plurality of sets of second target data, a corresponding set of second password information, and the first identification information in association with one another in the memory;
receiving, via the inputting device, input of specific password information that is required to print a first image represented by the first target data;
judging whether the specific password information received via the inputting device matches the first password information stored in the memory; and
when it is determined, in the judging, that the specific password information matches the first password information,
controlling the printing device to print the first image represented by the first target data that is stored in the memory in association with the first password information,
extracting, from the memory, the plurality of sets of second target data whose associated identification information is the first identification information associated with the first target data,
controlling the display to display a selection screen allowing the user to select a second image desired to be printed from among a plurality of second images represented by the plurality of sets of second target data, and
controlling the printing device to print a second image that is selected on the selection screen and is represented by corresponding second target data, and not to print a second image that is not selected on the selection screen.

2. The printing apparatus according to claim 1, wherein the controller is configured to further perform:
judging whether the first password information matches the second password information that is stored in the memory in association with the second target data representing the selected second image; and
when the first password information matches the second password information, controlling the printing device to print the selected second image, without receiving additional input of specific password information required to print the selected second image.

3. The printing apparatus according to claim 2, wherein the controller is configured to further perform:
- when the first password information does not match the second password information, receiving, via the inputting device, additional input of specific password information required to print the selected second image;
- judging whether the additionally-inputted specific password information matches the second password information; and
- when the additionally-inputted specific password information matches the second password information, controlling the printing device to print the selected second image.

4. The printing apparatus according to claim 1,
wherein when selection of at least one second image is received via the inputting device in response to the selection screen, the controller controls the printing device to print the selected second image.

5. The printing apparatus according to claim 4,
wherein the selection screen includes a region, in which a plurality of sets of second-target specifying information specifying the plurality of sets of second target data is indicated, and
wherein in response to input of designation of at least one set of second-target specifying information indicated on the selection screen to thereby select at least one second image, the controller controls the printing device to print the selected second image.

6. The printing apparatus according to claim 5, wherein the controller is configured to further perform:
- after having received input of designation of the at least one set of second-target specifying information indicated on the selection screen to thereby select at least one second image, judging whether the first password information matches the second password information corresponding to the selected second image, and
- wherein when the first password information matches the second password information, the controller controls the printing device to print the selected second image.

7. The printing apparatus according to claim 5,
wherein the region in the selection screen contains a matching region, in which matching second-target specifying information is indicated, and a non-matching region, in which non-matching second-target specifying information is indicated,
the matching second-target specifying information specifying the second target data that is stored in the memory in association with such second password information that is identical with the first password information,
the non-matching second-target specifying information specifying the second target data that is stored in the memory in association with such second password information that is different from the first password information.

8. The printing apparatus according to claim 4, wherein after having determined that the specific password information matches the first password information, the controller controls the printing device to start printing the first image, and controls the display to start displaying the selection screen, regardless of whether printing of the first image has been completed.

9. The printing apparatus according to claim 4,
wherein the controller is configured to further perform measuring an elapsed time from when the selection screen starts being displayed, and
wherein the controller controls the display to stop displaying the selection screen when the elapsed time exceeds a prescribed length of time.

10. A non-transitory computer readable storage medium storing a set of program instructions for a printing apparatus, the printing apparatus including: an inputting device; a printing device; a display; a network interface; and a processor: the program instructions, when executed by the processor, causing the printing apparatus to perform:
- receiving, via the network interface from a terminal device, a printing request for a set of first target data and a plurality of printing requests for a plurality of sets of second target data, the printing request for the set of first target data including a set of first password information associated with the first target data and first identification information identifying a user who uses the terminal device, a printing request for each set of second target data including a set of second password information associated with each set of second target data and the first identification information;
- storing the first target data, the first password information, and the first identification information in association with one another in a memory, and storing the plurality of sets of second target data, a corresponding set of second password information, and the first identification information in association with one another in the memory;
- receiving, via the inputting device, input of specific password information that is required to print a first image represented by the first target data;
- judging whether the specific password information received via the inputting device matches the first password information stored in the memory; and
- when it is determined, in the judging, that the specific password information matches the first password information,
  - controlling the printing device to print the first image represented by the first target data that is stored in the memory in association with the first password information,
  - extracting, from the memory, the plurality of sets of second target data whose associated identification information is the first identification information associated with the first target data,
  - controlling the display to display a selection screen allowing the user to select a second image desired to be printed from among a plurality of second images represented by the plurality of sets of second target data, and
  - controlling the printing device to print a second image that is selected on the selection screen and is represented by corresponding second target data, and not to print a second image that is not selected on the selection screen.

11. The non-transitory computer readable storage medium according to claim 10, wherein the program instructions, when executed by the processor, cause the printing apparatus to further perform:
- judging whether the first password information matches the second password information that is stored in the memory in association with the second target data representing the selected second image; and
- when the first password information matches the second password information, controlling the printing device to print the selected second image, without receiving additional input of specific password information required to print the selected second image.

12. The non-transitory computer readable storage medium according to claim 11, wherein the program instructions, when executed by the processor, cause the printing apparatus to further perform:
- when the first password information does not match the second password information, receiving, via the inputting device, additional input of specific password information required to print the selected second image;
- judging whether the additionally-inputted specific password information matches the second password information; and
- when the additionally-inputted specific password information matches the second password information, controlling the printing device to print the selected second image.

13. The non-transitory computer readable storage medium according to claim 10,
- wherein when selection of at least one second image is received via the inputting device in response to the selection screen, the printing device is controlled to print the selected second image.

14. The non-transitory computer readable storage medium according to claim 13,
- wherein the selection screen includes a region, in which a plurality of sets of second-target specifying information specifying the plurality of sets of second target data is indicated, and
- wherein in response to input of designation of at least one set of second-target specifying information indicated on the selection screen to thereby select at least one second image, the printing device is controlled to print the selected second image.

15. The non-transitory computer readable storage medium according to claim 14, wherein the program instructions, when executed by the processor, cause the printing apparatus to further perform:
- after having received input of designation of the at least one set of second-target specifying information indicated on the selection screen to thereby select at least one second image, judging whether the first password information matches the second password information corresponding to the selected second image,
- wherein when the first password information matches the second password information, the printing device is controlled to print the selected second image.

16. The non-transitory computer readable storage medium according to claim 14,
- wherein the region in the selection screen contains a matching region, in which matching second-target specifying information is indicated, and a non-matching region, in which non-matching second-target specifying information is indicated,
- the matching second-target specifying information specifying the second target data that is stored in the memory in association with such second password information that is identical with the first password information,
- the non-matching second-target specifying information specifying the second target data that is stored in the memory in association with such second password information that is different from the first password information.

17. The non-transitory computer readable storage medium according to claim 13, wherein after it is determined that the specific password information matches the first password information, the printing device is controlled to start printing the first image, and the display is controlled to start displaying the selection screen, regardless of whether printing of the first image has been completed.

18. The non-transitory computer readable storage medium according to claim 13, wherein the program instructions, when executed by the processor, cause the printing apparatus to further perform:
- measuring an elapsed time from when the selection screen starts being displayed,
- wherein the display is controlled to stop displaying the selection screen when the elapsed time exceeds a prescribed length of time.

* * * * *